UNITED STATES PATENT OFFICE.

IGNAZ ROSENBERG AND FRIEDRICH KRECKE, OF BIEBRICH, GERMANY, ASSIGNORS TO KALLE & CO., OF SAME PLACE.

SUBSTANTIVE DISAZO DYE.

SPECIFICATION forming part of Letters Patent No. 613,646, dated November 1, 1898.

Application filed December 27, 1897. Serial No. 663,479. (Specimens.)

*To all whom it may concern:*

Be it known that we, IGNAZ ROSENBERG, a subject of the Emperor of Austria-Hungary, and FRIEDRICH KRECKE, a subject of the King of Prussia, Emperor of Germany, doctors of philosophy, residing at Biebrich-on-the-Rhine, Germany, and assignors to KALLE & CO., of same place, have invented a new and useful Improvement in the Manufacture of a Mixed Substantive Disazo Dyestuff, (for which patents have been granted in England, No. 9,103, dated May 7, 1895; in France, No. 247,626, dated May 22, 1895, and in Germany, No. 93,359, dated March 31, 1895,) of which the following is a specification.

In United States Patent No. 588,182 a process is described for preparing mixed substantive disazo dyestuffs by combining the tetrazo compounds of the usual paradiamins with one molecular proportion of a phenol or an amin, or of a sulfo or carbo acid thereof, and one molecular proportion of 1.3.6 naphthylenediaminsulfo-acid. In the course of further investigations we have found especially that mixed substantive disazo dyestuff is of high technical value which is prepared by combining one molecule of tetrazo-ditolyl with one molecule of 2.8.6 amidonaphtholsulfo-acid and one molecule of 1.3.6 naphthylenediaminsulfo-acid. It dyes unmordanted cotton bluish-violet shades which are very fast to washing. The dyestuff is further distinguished by the fact that it can be diazotized upon the fiber and combined with the usual developers. When developed with beta-naphthol, it yields indigo-blue shades which are very fast to light and washing.

In order to carry out our invention, we proceed, for instance, as follows: 21.2 kilos tolidin are dissolved in three hundred liters of water and fifty-four kilos concentrated hydrochloric acid. After cooling with ice the diazotation is effected by adding fourteen kilos sodium nitrite. The so-obtained tetrazo-ditolyl solution is run into a cooled solution of twenty-four kilos 2.8.6 amidonaphtholsulfo-acid (G) and twenty kilos soda-ash in four hundred liters of water. In this manner an intermediate product is formed, to which after short stirring a solution of twenty-four kilos 1.3.6 naphthylenediaminsulfo-acid and twelve kilos soda-ash in five hundred liters of water is added. The formation of the coloring-matter begins immediately and is finished after some stirring. The mass is now heated up to about 80° centigrade and the dyestuff salted out, filtered, pressed, and dried. It represents a black powder soluble in water with violet-blue color and in concentrated sulfuric acid with blue color. In alcohol it is insoluble. From the solution in concentrated sulfuric acid the free acid of the coloring-matter is separated on addition of water as a black precipitate.

Now what we claim is—

1. The process of producing the specific mixed substantive disazo dyestuff having the formula

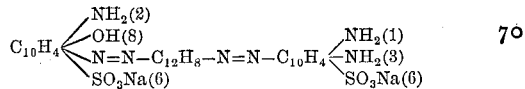

by combining the tetrazo compound of tolidin first with one molecular proportion of 2.8.6 amidonaphtholsulfo-acid (G) to an intermediate product which is then put into reaction with one molecular proportion of 1.3.6 naphthylenediaminsulfo-acid substantially as described.

2. The new mixed substantive disazo dyestuff herein described, producible by combining the tetrazo compound of tolidin first with one molecular proportion of 2.8.6 amidonaphtholsulfo-acid (G) and then reacting on the same with one molecular proportion of 1.3.6 naphthylenediaminsulfo-acid—which exists as a black powder insoluble in alcohol, soluble in water with a violet-blue color and in concentrated sulfuric acid with a pure-blue color, the solution of which in concentrated sulfuric acid is precipitated by addition of water, which dyes unmordanted cotton bluish-violet shades and which can be diazotized on the fiber and combined with the usual developers, yielding for instance with beta-naphthol indigo-blue shades fast to light and washing.

In testimony whereof we have signed our names to this specification in the presence of two subscribing witnesses.

IGNAZ ROSENBERG.
FRIEDRICH KRECKE.

Witnesses:
K. ELBEL,
C. REINHARD.